Sept. 26, 1967  HIDEO KONDO ETAL  3,343,420
DIFFERENTIAL PRESSURE TRANSMITTERS

Filed Nov. 23, 1964  2 Sheets-Sheet 1

INVENTORS
Hideo Kondo
Mitsuo Ai
Keiichi Sato

By: Paul M. Craig, Jr.
ATTORNEY

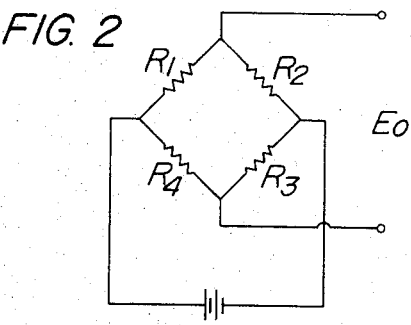
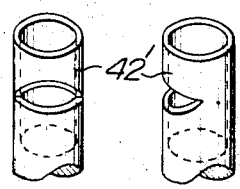
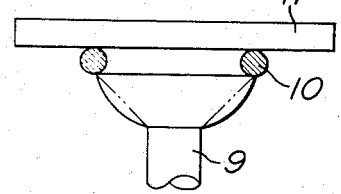
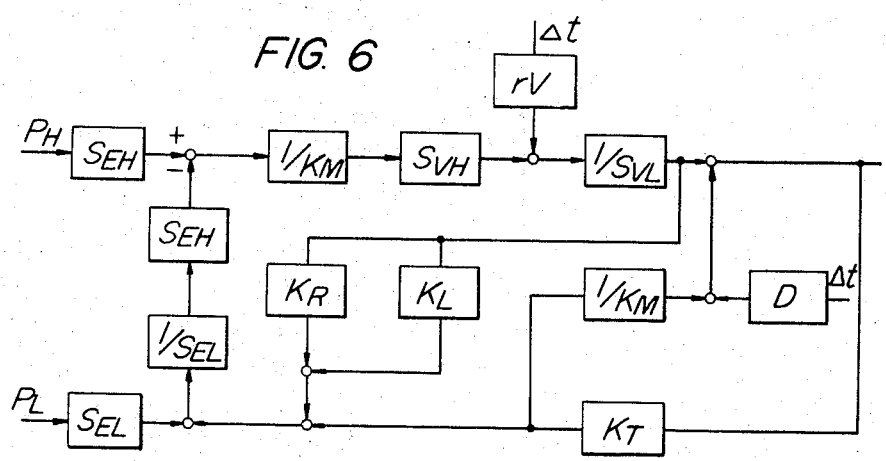

United States Patent Office 3,343,420
Patented Sept. 26, 1967

3,343,420
DIFFERENTIAL PRESSURE TRANSMITTERS
Hideo Kondo and Mitsuo Ai, Katsuta-shi, and Keiichi Sato, Hitachi-shi, Japan, assignors to Hitachi, Ltd., Tokyo, Japan, a corporation of Japan
Filed Nov. 23, 1964, Ser. No. 413,146
Claims priority, application Japan, Nov. 29, 1963, 38/63,747
4 Claims. (Cl. 73—398)

This invention relates to differential pressure transmitters and particularly to those of the electronic type.

Recently, all electronic measuring devices have been increasingly employed replacing conventional pneumatic ones in various fields of application including the petrochemical industry because of their particular suitability for a large-scale instrumentation, thorough centralization of plant control and connection to data processing systems.

Among others, transmitter units for transmitting a differential pressure, a pressure, a liquid level or the like now generally include an electronic system employed in place of a conventional pneumatic one in combination with a differential pressure detector unit, which has previously been developed as part of pneumatic type measuring devices and has been giving satisfactory results. For example, nozzle flappers have been replaced by a differential transformer or an oscillating coil, pilot valves by a transistor amplifier, and feedback bellows by a force motor.

With such system, however, the force obtainable for negative feedback with the force motor is smaller than the one obtainable with a feedback bellows by one or two figures, and, since an operating mechanism having a low natural frequency is involved in the negative feedback system, only a limited loop gain is obtainable making the system inferior to the fully balanced system realized in pneumatic transmitters particularly in stability under disturbances.

The present invention is intended to make the most of the advantages inherent to electronic transmitters, completely departing from the principles and structure of pneumatic transmitters, and provides a pressure detector unit for a transmitter which employs a strain gauge as a displacement to electric quantity conversion element to convert a differential pressure or the like industrial quantity into an electric quantity directly at the point of measurement without employing any intermediary link mechanism.

The present invention has for its object to provide a pressure detector unit of the kind described the movable parts of which are all confined within a pressure vessel to eliminate the need for flexible seals while thereby to provide an improved environmental resistance and hence an operational characteristic stable under high pressures.

Another object of the present invention is to provide such unit which includes an oscillation system having a high natural frequency by dispensing with any link mechanism or contacting fulcrums for displacement control and negative feedback operation and thus is hardly susceptible to external forces such as shock, vibration and the like.

A further object of the present invention is to provide a detector unit of the kind described which requires no calibration after the assembling of the unit.

The above and other objects, features and advantages of the present invention will become apparent from the following description when taken in conjunction with the accompanying drawings, in which:

FIG. 2 illustrates a typical strain gauge circuit usable in the present invention;

FIG. 5 illustrates one form of damper valve usable in the present invention;

FIG. 6 is a block diagram illustrating the operating principles of the present invention; and FIG. 7 illustrates one form of stop valve usable in the present invention for prevention of any excessive pressure difference.

Figure 1:
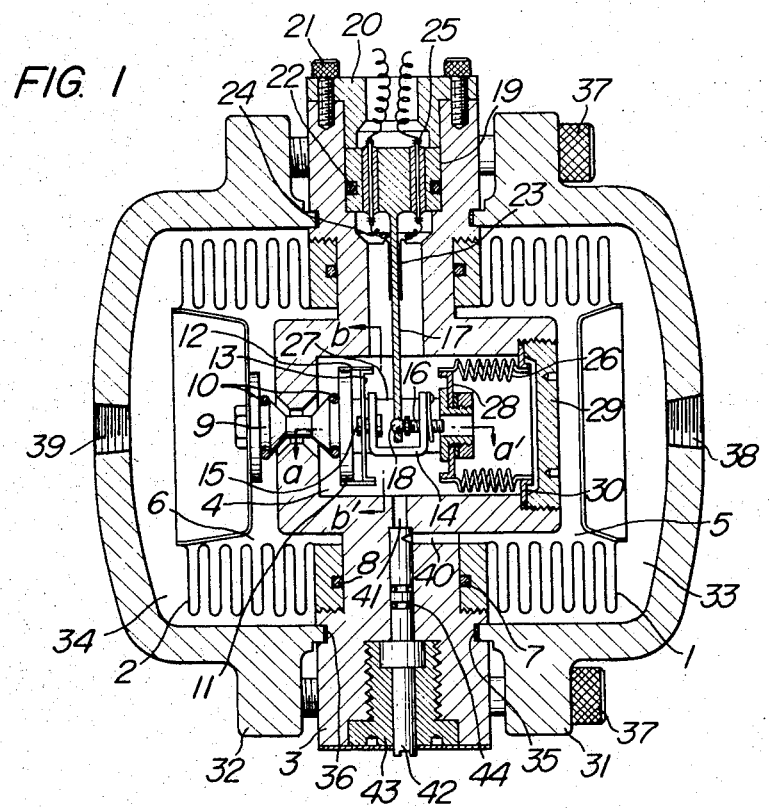
FIG. 1 illustrates a differential pressure transmitter embodying the present invention in cross section.

Referring to the drawing and particularly to FIG. 1, reference numeral 1 indicates a first or high-pressure bellows, and 2 a second or low-pressure bellows. As shown, the two bellows are secured to the body 3 having a hollow chamber or cavity 4 by screw means. Chambers 5 and 6 are defined between the body and the respective bellows 1 and 2, and are perfectly sealed from the exterior atmosphere by O-rings 7 and 8, respectively. These chambers 4, 5 and 6 are filled with a liquid which is noncompressible. Numeral 9 indicates a rod for transmitting the displacement of the low pressure bellows 2 to a displacement-to-electric quantity conversion element and the rod is formed at opposite ends with conical portions forming a stop valve for prevention of breakage due to any unusual pressures such as over or reverse pressure. Stop rings 10 are mounted on the maximum diameter portions of the respective conical formations. The inner most end 11 of the rod 9 is formed to connect with a leaf spring 12, which carries a bimetal 13 for temperature compensation, and a motion transmitting plate 27. A U-shaped member 14 is connected at one end with the bimetal 13 by means of a pin 15 and carries at the other end a projection 16 which is disposed to make a point contact with a ball 18 embedded in a cantilever 17 at one end thereof. The other end of the cantilever 17 takes the form of a plug 19 which is secured in place in the body 3 by means of a flange 20, which in turn is secured to the body by bolts 21. An O-ring 22 is mounted on the plug 19 to completely seal the cavity 4 in the body from the exterior atmosphere. Strain gauges 23 are bonded to the opposite sides of the cantilever 17 and each give a resistance value variable in proportion to the strain; the strain is proportional to the displacement of the tip of the cantilever 17. Leads 24 extend from the respective strain gauges 23 to outlet terminals 25 and electrically connected to the exterior.

Referring to FIG. 2, which illustrates a typical electrical circuit for strain gauges 23, the resistances $R_1$ and $R_3$ of the strain gauges secured to one side of the cantilever 17 and the resistances $R_2$ and $R_4$ of those secured to the other side of the cantilever are arranged to form a bridge circuit. When the gauges are subjected to no strain, the bridge circuit is in equilibrium and no voltage appears at the output end of the circuit. If the cantilever 17 is deflected so that the strain gauges $R_1$ and $R_3$ on one side of the cantilever are stretched while the strain gauges $R_2$ and $R_4$ on the other side thereof are contracted, a voltage appears correspondingly on the output end of the circuit and the magnitude of the voltage is proportional to the strain of the cantilever 17.

Figure 3:
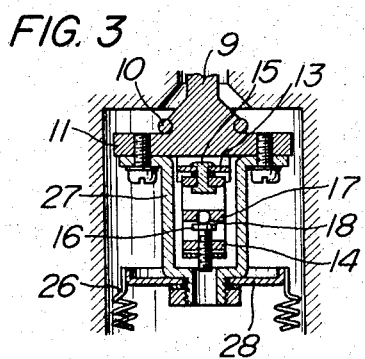
FIG. 3 is a cross-sectional view taken along the line $a-a'$ in FIG. 1.
Figure 4:
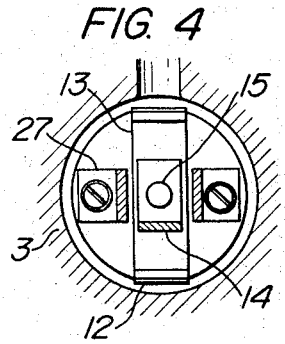
FIG. 4 is a cross-sectional view taken along the line $b-b'$ in FIG. 1.

Range springs 26 are welded at one end to a disc 28 secured to the motion transmitting plate 27 by screw means and at the other end to another disc 30 secured to the body 3 by a cup screw 29. The motion transmitting plate 27 serves to transmit the displacement of the rod 9 to the range springs 26. The manner in which the range springs 26 are joined with the rod 9 is illustrated clearly in FIGS. 3 and 4, which are cross-sectional views, respectively, taken along the lines a—a' and b—b' in FIG. 1.

It will be apparent that any displacement of the bellows 2 is transmitted through rod 9, leaf spring 12, bimetal 13, U-shaped member 14, and projection 16 to the cantilever 17 to strain the latter and thus is converted into an electrical quantity by the strain gauges 23 bonded to the cantilever 17. A the same time, the displacement of the bellows 2 is transmitted through the motion transmitting plate 27 and disc 28 to range springs 26. Thus, according to the present invention, the movable parts associated are all formed in an integral unit thus giving to the oscillation system a high natural frequency value of the range of from 285 to 350 cycles per second in contrast to that of the order of from 25 to 45 cycles per second obtainable with any previous system employing a link mechanism and contacting fulcrums. Thus, the device according to the present invention has an important advantage that it is hardly susceptible to any external force such as shock and vibration.

Secured to the opposite sides of the body 3 by means of bolts 37 are housings 31 and 32 which define cavities or chambers 33 and 34 for imparting pressure to the high- and low-pressure bellows 1 and 2, respectively, with gaskets 35 and 36 interposed between the body and the respective housings to seal the chambers 33 and 34. Fluid pressure is introduced into the respective chambers 33 and 34 through apertures 38 and 39 formed in the respective housings 31 and 32.

Passages 40 and 41 are formed to intercommunicate the chambers 4 and 5 and the fil-liquid for the purpose of transmitting the movement of the high-pressure bellows 1 to the low-pressure bellows 2 can flow through the passages 40 and 41. Arranged in the passage means is a damper valve 42 for controlling the rate of flow therethrough. Referring to FIG 5, which illustrates one form of such damper valve in detail, the damper valve includes an opening 42' having an effective area variable to control the rate of liquid flow therethrough. The damper valve 42 is supported by a sleeve 43, as shown, so as to be readily adjustable from the exterior and is equipped with an O-ring 44 for leakage prevention. The damper valve 42 can be turned by means of an appropriate screw driver to vary the opening area and hence the rate of liquid flow. It will be apparent that the damper valve 42 also serves to effectively attenuate any fluid pulsation.

In operation of the inventive device, high pressure fluid is introduced through aperture 38 and low pressure fluid through aperture 39. Thus, the high-pressure bellows 1 is compressed so that the fil-liquid is moved into the body cavity 4 through passage 40, damper valve 42 and passage 41 and further flows past the rod 9 into the chamber 6 in the low-pressure bellows 2. The amount of liquid displaced and hence the displacement of the low-pressure bellows are proportional to the difference between the two fluid pressures. In fact, the low-pressure bellows 2 is displaced to a position in which the differential pressure force is balanced with the counter force resulting from the overall spring constant of the combination including the low- and high-pressure bellows 1 and 2, cantilever 17 and range springs 26. Such displacement is converted to a surface strain of the cantilever 17 which is detected by the strain gauges forming a bridge circuit as an unbalanced output voltage.

This relationship is illustrated in the block diagram of FIG. 6, in which $S_{VH}$ represents the effective volumetric area of the high-pressure bellows in cm.$^2$, $S_{VL}$ that of the low-pressure bellows in cm.$^2$, $S_{EH}$ the effective pressure area of the high-pressure bellows in cm.$^2$, $S_{EL}$ that of the low-pressure bellows in cm.$^2$, $K_L$ the spring constant of the low-pressure bellows in kg./cm., $K_R$ that of the range springs in kg./cm., $K_T$ that of the cantilever in kg./cm., $K_M$ that of the bimetal in kg./cm., $\gamma$ the expansion coefficient of the fil-liquid in /° C., V the entire volume of the fil-liquid in cm.$^3$, and D the displacement of the bimetal in cm./° C.

The displacement $\delta$ of the tip of the cantilever in cm. can be given from the block diagram of FIG. 6 as follows:

$$\delta = \frac{P_H - P_L}{S_{VL}\left\{\dfrac{K_H}{S_{EH}S_{VH}} + \dfrac{K_L + K_R + K_T}{S_{EL}S_{VL}} + \dfrac{K_T}{K_M}\left(\dfrac{K_H}{S_{EH}S_{VH}} + \dfrac{K_L + K_R}{S_{EL}S_{VL}}\right)\right\}}$$

$$= K(P_H - P_L) \tag{1}$$

where $K_H$ indicates the spring constant of the high-pressure bellows in kg./cm., $P_H$ the pressure of the high-pressure fluid in kg./cm.$^2$ and $P_L$ that of the low-pressure fluid in kg./cm.$^2$.

The relationship between the displacement $\delta$ of the tip of the cantilever 17 and the unbalanced output voltage of the bridge circuit is expressed by the following Formula (2).

$$E_O = K' \cdot G_f \cdot R_s \cdot I \cdot \delta = K'' \delta \tag{2}$$

where $G_f$ indicates the gauge factor of the strain gauges, $R_s$ the resistance of the strain gauges in $\Omega$, I the current impressed upon the strain gauges in mA, and K' the proportional constant.

From Equations (1) and (2) is obtainable the following proportional relation between the differential pressure $(P_H - P_L)$ and the unbalanced volage $E_O$.

$$E_O = KK''(P_H - P_L) \tag{3}$$

The unbalanced output voltage $E_O$ of the bridge circuit is led to the exterior and amplified by an appropriate amplifier to be indicated on an indicating meter as a differential pressure.

According to the present invention, as apparent from the foregoing description on the operating principles of the invention, the coefficient of the output voltage includes only constants, which are all determined by the configuration of the bellows, range springs and cantilever, the material of the strain gauge wire and the magnitude of the impressed current and can be individually measured. In addition, these constants are independent from the assembling and adjusting processes, at all times having the same magnitude. In other words, these processes do not involve any factor relating to the characteristics of the finished device, but have a reproducibility in actual production. This means that the device according to the present invention inherently has a uniformity and a reproducibility eliminating the need for temperature adjustment after assemblage and accordingly the device has an important advantage that it can suitably be produced in large quantities with a substantial uniformity and reproducibility as long as the respective component parts are made uniform in their characteristics.

Further advantageous features of the device according to the present invention will be described below.

First, the device of the invention is very limited in number of component parts as it dispenses with any link mechanism or contacting elements and hence has a highly improved reliability.

Secondly, since the range springs are kept out of contact with the fluid being measured, no problem of corrosion is involved, enabling use of elastic materials with constant modulus which are relatively susceptible to corrosion, and there is no danger of misoperation of the springs due to drain or other causes.

Thirdly, with the inventive device, it is extremely easy to change the range of the device. Though with conventional devices of the bellows type the range can be changed only by exchange of the range springs, the range of the inventive device can be changed simply by varying the magnitude of the input current to the strain gauges or by varying the gain of the amplifier provided for amplification of the output voltage. By either means, the output voltage can be varied for the same strain given, enabling the range of the device to be changed by approximately 100 to 500 percent without the need of exchanging the range springs.

Fourthly, attention is called to the use of a valve for prevention of any excessive differential pressure otherwise resulting from an over or a reverse pressure and to the configuration of the valve. Assuming that an over pressure is applied, the fil-liquid is moved into the chamber 6 to extend the low-pressure bellows 2. However, at the instant when the low-pressure bellows is extended to a certain extent, the conical portion of the rod 9 is brought into close contact with the adjacent conically formed portion of body 3 to interrupt the displacement of the fil-liquid and hence further extension of the bellows 2. In case of a reverse pressure, the bellows is contracted so that the valve acts to interrupt the displacement of the fil-liquid from the chamber into the cavity 4 defined in the body. It will be apparent that breakage of the bellows can be prevented by the action of the valve described above. When the pressure is restored to the initial valve, there is a danger that the bellows cannot be restored because of the wedge action between the conical formations on the valve and the body 3 abutting against each other even if the cooperating portions are formed at different conical angles. To avoid this danger, the conical surface formed at the rod end is preferably curved as illustrated in FIG. 7. By this means, the device can be smoothly restored without any trouble whenever the pressure is restored since the conical surface makes point contact with the cooperating female formation without any danger of being bit in owing to the substantial curvature of the surface even when an excessive differential pressure is applied.

A fifth advantageous feature of the present invention is the use of a bimetal for temperature compensation. Any temperature rise causes expansion of the fil-liquid and metal parts as well as some temperature effect upon the strain gauges. According to the present invention, these and other errors resulting from temperature change are effectively compensated for by the use of a bimetal.

Having shown and described the present invention, it is to be understood that the present invention is not restricted to the details set forth but many changes and modifications can be made without departing from the scope and spirit of the invention as defined in the appended claims.

What is claimed is:

1. A differential pressure transmitter, comprising: an outer hollow generally sealed housing; a hollow body member mounted within said housing and having a central chamber; first bellows means mounted between one side of said housing and said body member for forming a first outer chamber between said first bellows means and said one side of said housing, and a first inner chamber between said first bellows means and said body member that is sealed with respect to said first outer chamber; second bellows means mounted between the other side of said housing and said body member for forming a second outer chamber between said housing other side and said second bellows means and a second inner chamber between said body member and said second bellows means that is sealed with respect to said second outer chamber; said first and second outer chambers being sealed with respect to each other; first passage means forming fluid communication between said first inner chamber and said central chamber and having first valve means therein for damping and preventing fluid pulsations through said first passage means; second passage means providing fluid communication between said second inner chamber and said central chamber and having second valve means therein for preventing excess differential pressures; rod means drivingly connecting said second valve means for movement with said second bellows means; a cantilever attached to said body member and extending into said central chamber; strain gauges bonded to said cantilever and having electrical connections extending through said body member to the outside of said housing; incompressible fluid filling said first and second inner chambers and said central chamber; said first inner chamber, said second inner chamber and said central chamber being sealed with respect to said first outer chamber; said second outer chamber and the exterior of said housing; a cantilever contact member; bimetallic temperature responsive means drivingly connecting said rod means and said contact member; said bimetallic temperature responsive means compensating for variations in temperature by providing relative movement between said rod means and said contact member in response to temperature changes; said cantilever and said contact member including means providing contact therebetween for bending the outer free end of said cantilever in response to movement of said contact member; range spring means drivingly connected between said body member and said rod means within said central chamber.

2. The differential pressure transmitter of claim 1, wherein said means providing contact between said cantilever and said contact member establishes only a point contact.

3. The differential pressure transmitter of claim 1, including: said second valve means having mutually facing conical movable valve portions rigidly secured to said rod means in said second inner chamber and said central chamber, respectively, and cooperating conical seats on said body member; said first valve means consisting of an adjustable throttle valve; rigid strap means extending between and drivingly connecting said rod means and said range spring means, and having substantially parallel arm members on opposite sides of the free terminal end of said cantilever; a U-shaped bracket member connected to said contact member and having one leg substantially parallel with said cantilever; a web portion aligned with the longitudinal axis of said cantilever and a second leg portion on the diametrically opposite side of said cantilever from said first leg portoin for drivingly engaging said cantilever on diametrically opposite sides.

4. The differential pressure transmitter of claim 3, wherein said means providing contact between said cantilever and said contact member establishes only a point contact.

References Cited

UNITED STATES PATENTS

| | | | |
|---|---|---|---|
| 2,772,569 | 12/1956 | Ruge | 73—398 |
| 3,241,373 | 3/1966 | Ricketts et al. | |
| 3,248,936 | 5/1966 | Lee et al. | 73—393 |

FOREIGN PATENTS

| | | |
|---|---|---|
| 1,148,936 | 7/1957 | France. |

LOUIS R. PRINCE, *Primary Examiner.*

D. O. WOODIEL, *Assistant Examiner.*